United States Patent
Yang et al.

(10) Patent No.: US 7,336,332 B2
(45) Date of Patent: Feb. 26, 2008

(54) REFLECTIVE TYPE CONTINUOUS DOMAIN IN-PLANE SWITCHING LIQUID CRYSTAL DISPLAY

(75) Inventors: Chiu-Lien Yang, Miao-Li (TW); Jia-Pang Pang, Miao-Li (TW); Chueh-Ju Chen, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 238 days.

(21) Appl. No.: 11/028,127

(22) Filed: Dec. 31, 2004

(65) Prior Publication Data

US 2005/0212999 A1    Sep. 29, 2005

(30) Foreign Application Priority Data

Mar. 26, 2004 (TW) .............................. 93108255 A

(51) Int. Cl.
*G02F 1/1343* (2006.01)
(52) U.S. Cl. .................. 349/141; 349/145; 349/146
(58) Field of Classification Search ................ 349/141, 349/145, 146
See application file for complete search history.

(56) References Cited

U.S. PATENT DOCUMENTS

| | | | |
|---|---|---|---|
| 5,177,628 A * | 1/1993 | Moddel | 349/28 |
| 5,977,562 A * | 11/1999 | Hirakata et al. | 257/72 |
| 6,618,109 B2 * | 9/2003 | Hidehira et al. | 349/141 |
| 6,741,311 B1 * | 5/2004 | Hong et al. | 349/141 |
| 6,791,644 B2 | 9/2004 | Toda | |
| 6,803,980 B2 | 10/2004 | Funahata et al. | |
| 6,859,248 B2 * | 2/2005 | Matsumoto et al. | 349/141 |
| 6,972,824 B2 * | 12/2005 | Masutani et al. | 349/192 |
| 2001/0008693 A1 * | 7/2001 | Fink et al. | 428/421 |
| 2004/0041742 A1 * | 3/2004 | Fink et al. | 343/912 |
| 2005/0206826 A1 * | 9/2005 | Yang et al. | 349/143 |
| 2006/0209243 A1 * | 9/2006 | Chen et al. | 349/145 |
| 2007/0030432 A1 * | 2/2007 | Chen et al. | 349/141 |
| 2007/0046867 A1 * | 3/2007 | Yang et al. | 349/106 |

* cited by examiner

*Primary Examiner*—David Nelms
*Assistant Examiner*—David Y. Chung
(74) *Attorney, Agent, or Firm*—Wei Te Chung

(57) ABSTRACT

A reflective type IPS LCD includes a transparent upper substrate (100) and a lower substrate (200), and liquid crystal molecules (300) interposed between the substrates. A reflection layer (250) is disposed on the lower substrate. A plurality of gate lines (170) and a plurality of data lines (180) are formed on the upper substrate, thereby defining a plurality of pixel regions arranged in a matrix. Each pixel region includes pixel electrodes (210) and common electrodes (220). The pixel electrodes and the common electrodes have a bent configuration, and are spaced apart from each other. Therefore the electric field generated by them is along two directions, and the LCD exhibits a two-domain display effect. When viewing the LCD display from any oblique angle, the color shifts generated by the two domains counteract, and thus the overall color shift of the display is small.

5 Claims, 5 Drawing Sheets

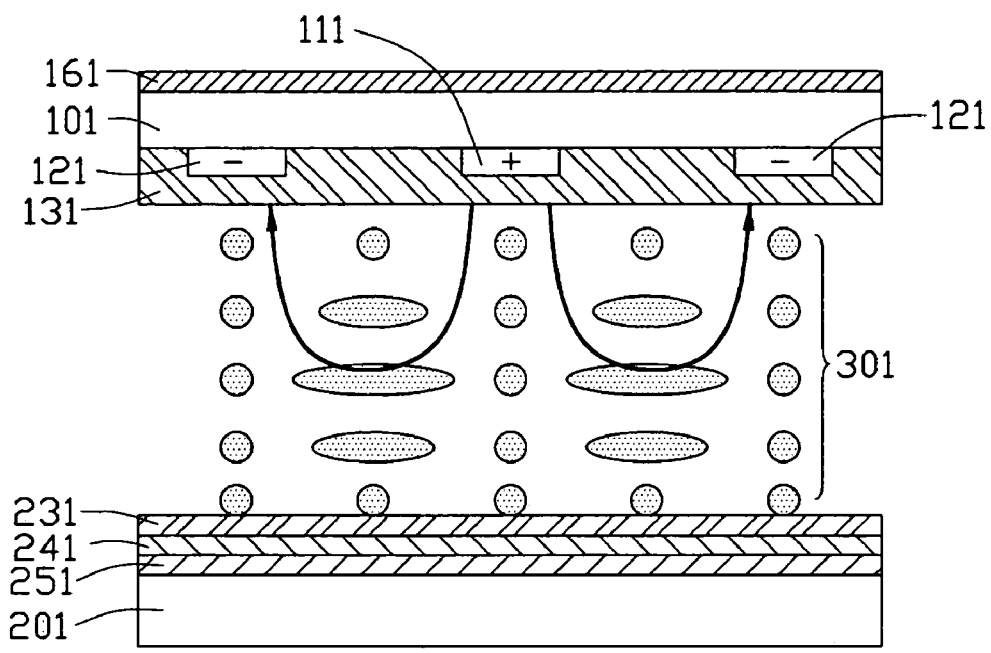
FIG. 3
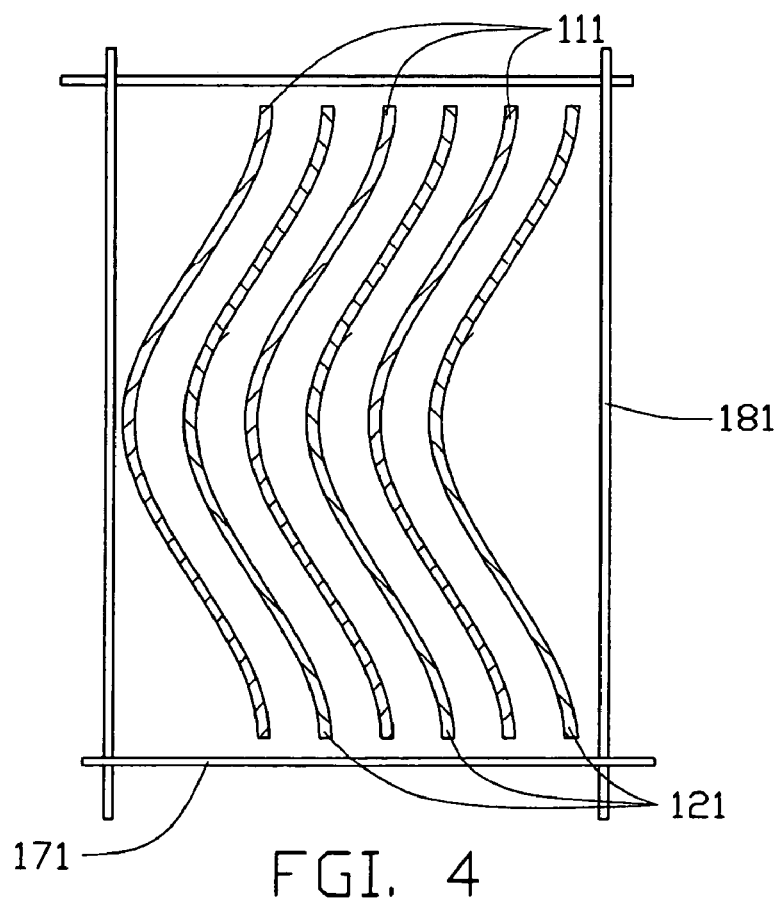
FGI. 4

REFLECTIVE TYPE CONTINUOUS DOMAIN IN-PLANE SWITCHING LIQUID CRYSTAL DISPLAY

BACKGROUND OF THE INVENTION

1. Field of the Invention

The present invention relates to a reflective type IPS (in-plane switching) mode LCD (liquid crystal display), and the control of liquid crystal molecules therein.

2. Description of Prior Art

A liquid crystal display utilizes the optical and electrical anisotropy of liquid crystal molecules thereof in order to produce an image. The liquid crystal molecules have a particular passive orientation when no voltage is applied thereto. However, in a driven state, the liquid crystal molecules change their orientation according to the strength and direction of the driving electric field. A polarization state of incident light changes when the light transmits through the liquid crystal molecules, due to the optical anisotropy of the liquid crystal molecules. The extent of the change depends on the orientation of the liquid crystal molecules. Thus, by properly controlling the driving electric field, an orientation of the liquid crystal molecules is changed and a desired image can be produced.

The TN (twisted nematic) mode LCD was the first main type of LCD developed. Even though TN mode LCDs have been put into use in many applications, they have an inherent drawback that cannot be eliminated; namely, a very narrow viewing angle. By adding compensation films on TN mode LCDs, this problem can be ameliorated to some extent. However, the cost of the TN mode LCD is increased. Therefore, a totally different driving means called IPS (in-plane switching) was proposed as early as in 1974. Then in 1993, Hitachi Corporation filed its first US patent application concerning IPS, in which an IPS mode LCD was disclosed.

A conventional IPS mode LCD has an upper substrate, a lower substrate, and a liquid crystal layer interposed therebetween. The liquid crystal layer has a plurality of liquid crystal molecules which have a same orientation when not driven, this orientation being parallel to the substrates. Pixel electrodes and common electrodes are disposed on the lower substrate. When a voltage is applied to the electrodes, an electric field is generated between the electrodes. The electric field drives the liquid crystal molecules to rotate in a plane parallel to the substrates. This rotation results in a change in light transmission. In other words, the operation of the IPS mode LCD is such that the liquid crystal molecules rotate in a plane parallel with the substrates in order to fulfill optical switching. The IPS LCD has the important advantage of a wide viewing angle. In basic IPS mode LCDs, the pixel electrodes and common electrodes are each comb-shaped. The electric field of these LCDs in a driven state is along a certain direction. Thus these LCDs are referred to as single domain IPS LCDs. When the displayed image is viewed at different oblique angles, a viewer may notice a quite large color shift. When this single domain IPS technology is applied in a reflective type liquid crystal display, color shift is likewise a problem.

Referring to FIG. 8 and FIG. 9, these are schematic plan representations of a conventional reflective type IPS liquid crystal display disclosed in U.S. Pat. No. 6,577,368 issued on Jun. 10, 2003. The liquid crystal display comprises an upper substrate (not shown), a lower substrate 80, and liquid crystal molecules (not shown) interposed between the substrates. A plurality of gate lines 10 and data lines 70 are formed on the lower substrate 80, for transmitting a gate signal and a data signal respectively. TFTs (thin film transistors) are positioned at the intersections of the gate lines 10 and data lines 70. Each TFT comprises a gate electrode 11, a source electrode 71, and a drain electrode 72. Pixel electrodes 75 and common electrodes 20 are formed on the lower substrate 80, for generating a driving electric field. A lower alignment film 4 is disposed at the lower substrate 80, to control the alignment of the liquid crystal molecules.

Each of the pixel electrodes 75 and the common electrodes 20 is comb-shaped. Therefore when a voltage is applied to the pixel and common electrodes 75, 20, a parallel electric field mainly along a single direction is generated. The pixel electrodes 75 and the common electrodes 20 are made of an opaque material having high reflectance.

When the voltage is applied, the liquid crystal display is said to be in a driven state. The liquid crystal molecules have the same orientation due to the electric field. When the LCD display is viewed from an oblique angle, a color shift is seen. That is, the viewer sees a yellowish or a bluish image.

It is desired to provide a multi-domain reflective type IPS liquid crystal display which overcomes the above-described deficiencies.

SUMMARY OF THE INVENTION

An object of the present invention is to provide a multi-domain reflective type IPS liquid crystal display which has a relatively small color shift.

A preferred kind of reflective type IPS liquid crystal display of the present invention comprises a transparent upper substrate and a lower substrate, and liquid crystal molecules interposed between the substrates. A reflection layer is disposed on the lower substrate. A plurality of gate lines and a plurality of data lines are formed on one of the substrates, thereby defining a plurality of pixel regions arranged in a matrix. Each pixel region comprises a plurality of pixel electrodes and a plurality of common electrodes. The pixel electrodes and the common electrodes have a bent configuration, and are uniformly spaced apart from each other.

Because the pixel and common electrodes have the bent configuration, the electric field generated by them is along various different directions in a pixel region. The pixel region forms multi-domains. Therefore the color shift of each pixel region at oblique viewing angles is counteracted and the whole liquid crystal display has a small color shift.

Other objects, advantages, and novel features of the present invention will become more apparent from the following detailed description when taken in conjunction with the accompanying drawings, in which:

BRIEF DESCRIPTION OF THE DRAWINGS

FIG. 3 is a schematic, side cross-sectional view of part of a reflective type IPS LCD according to a second embodiment of the present invention;

FIG. 4 is a schematic, top elevation of parts of a pixel region of the reflective type IPS LCD of FIG. 3, showing a configuration of pixel electrodes and common electrodes;

DETAILED DESCRIPTION OF THE INVENTION

Figure 1:
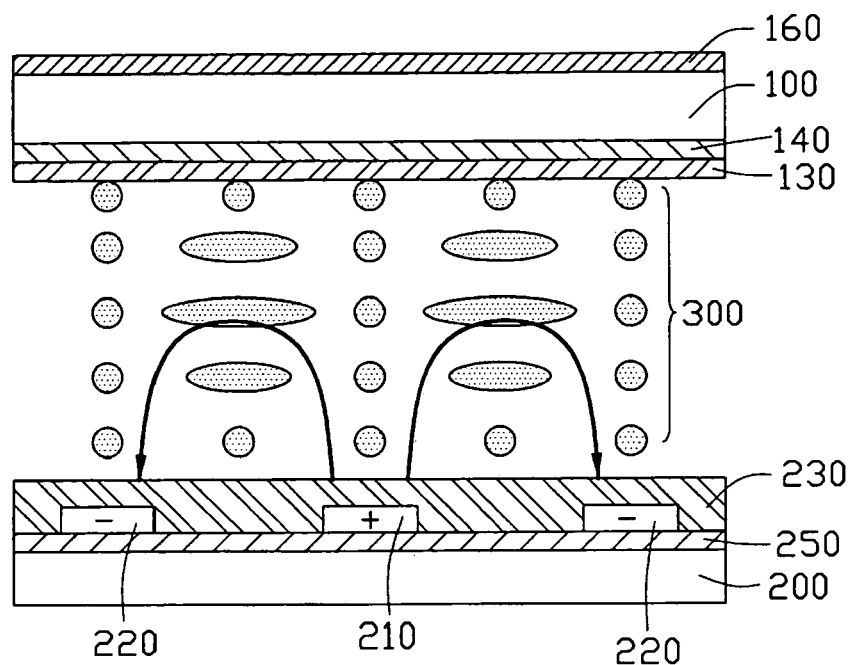
FIG. 1 is a schematic, side cross-sectional view of part of a reflective type IPS LCD according to a first embodiment of the present invention.
Figure 2:
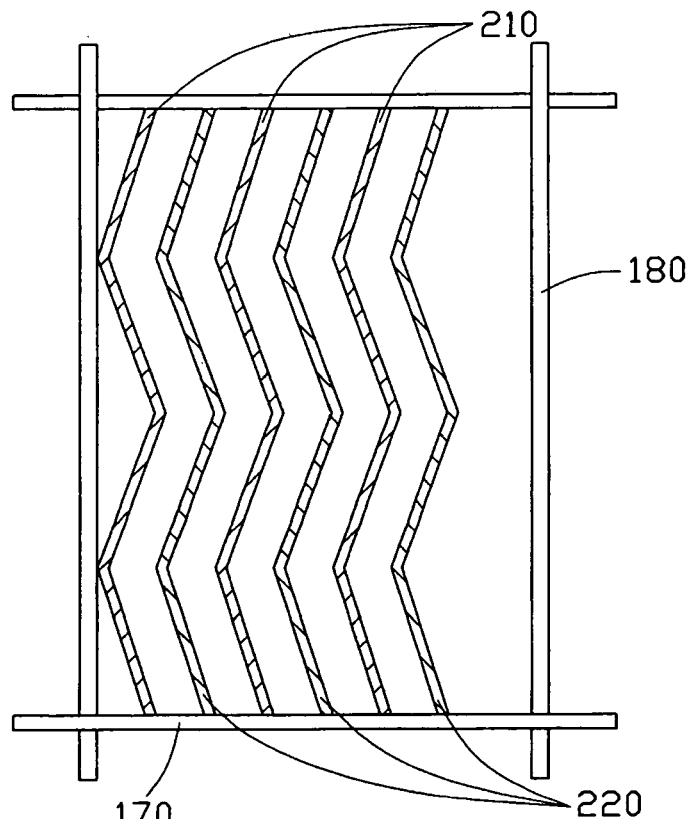
FIG. 2 is a schematic, top elevation of parts of a pixel region of the reflective type IPS LCD of FIG. 1, showing a configuration of pixel electrodes and common electrodes.

Referring to FIG. 1 and FIG. 2, these are respectively a side cross-sectional view of a reflective type in-plane switching liquid crystal display (IPS LCD) according to a first embodiment of the present invention and a plan view of a pixel region of the IPS LCD. This IPS LCD comprises a transparent upper substrate 100, a lower substrate 200, and positive liquid crystal molecules 300 interposed between the upper and lower substrates 100, 200. An upper polarizer 160 is disposed on the outer side of the upper substrate 100, a color filter 140 is disposed on an underside of the upper substrate 100, and an upper alignment film 130 is disposed on an underside of the color filter 140. A reflection layer 250 is formed on the lower substrate 200. A plurality of gate lines 170 and data lines 180 are disposed on the lower substrate 200, and define a plurality of pixel regions arranged in a matrix. Each pixel region comprises a plurality of pixel electrodes 210 and a plurality of common electrodes 220. The pixel electrodes 210 and the common electrodes 220 have a similar zigzagged configuration, and are uniformly spaced apart from each other. A lower alignment film 230 is disposed on the reflection layer 250 and the electrodes 210, 220.

When a voltage is applied, because the pixel and common electrodes 210, 220 have zigzagged configurations, the electric field (not shown) generated is mainly along two directions, and the IPS LCD exhibits a two-domain display effect. When viewing the IPS LCD display from any oblique angle, the color shifts generated by the two domains counteract each other, and thus the overall color shift of the display is small.

Referring to FIG. 3 and FIG. 4, a reflective type in-plane switching liquid crystal display (IPS LCD) according to the second embodiment of the present invention comprises a transparent upper substrate 101, a lower substrate 201, and positive liquid crystal molecules 301 interposed between the upper and lower substrates 101, 201. A lower alignment film 231, a color filter 241 and a reflection layer 251 are stacked on the lower substrate 201 in that order from top to bottom. An upper polarizer 161 is disposed on an outer side of the upper substrate 101. A plurality of gate lines 171 and data lines 181 are disposed on the upper substrate 101, and define a plurality of pixel regions arranged in a matrix. Each pixel region comprises a plurality of pixel electrodes 111 and a plurality of common electrodes 121. The pixel electrodes 111 and the common electrodes 121 have a similar arcuate configuration, and are uniformly spaced apart from each other. An upper alignment film 131 is disposed on the electrodes 111, 121 and the upper substrate 101.

Because the pixel and common electrodes 111, 121 have arcuate configurations, the electric field generated by them is a smooth continuum of multiple domains. The IPS LCD provides equally fine visual performance at various different viewing angles, and has a smaller color shift compared to the IPS LCD of the first embodiment.

Figure 5:
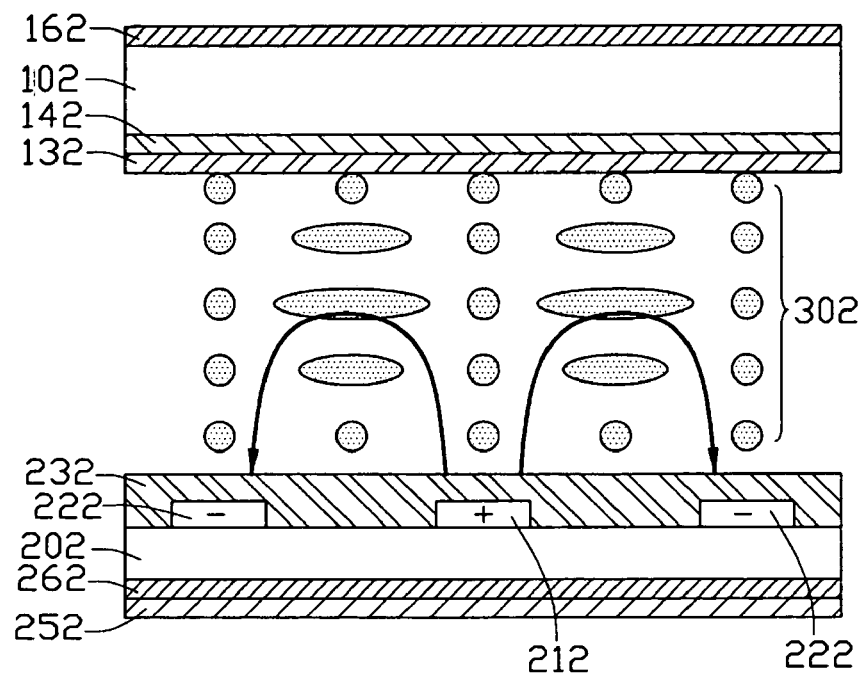
FIG. 5 is a schematic, side cross-sectional view of part of a reflective type IPS LCD according to a third embodiment of the present invention.
Figure 6:
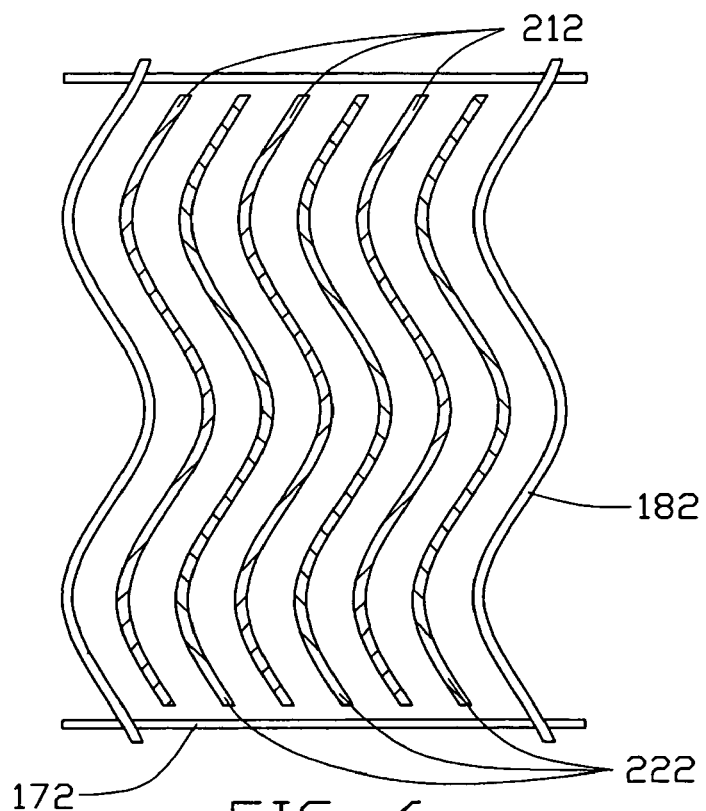
FIG. 6 is a schematic, top elevation of parts of a pixel region of the reflective type IPS LCD of FIG. 5, showing a configuration of pixel electrodes and common electrodes.

Referring to FIG. 5 and FIG. 6, a reflective type in-plane switching liquid crystal display (IPS LCD) according to the third embodiment of the present invention comprises a transparent upper substrate 102, a lower substrate 202, and positive liquid crystal molecules 302 interposed between the upper and lower substrates 102, 202. An upper polarizer 162 and a lower polarizer 262 are disposed on outer sides of the substrates 102, 202 respectively. A color filter 142 is disposed on an underside of the upper substrate 102, and an alignment film 132 is disposed on an underside of the color filter 142. A reflection layer 252 is disposed on an outer side of the lower alignment film 262. The lower substrate 202 is transparent, so as to let light beams pass through and reach the reflection layer 252. A plurality of gate lines 172 and data lines 182 are formed on the lower substrate 202, and define a plurality of pixel regions arranged in a matrix. Each pixel region comprises a plurality of pixel electrodes 212 and a plurality of common electrode 222. The pixel electrodes 212 and the common electrodes 222 have a similar wavy configuration, and are uniformly spaced apart from each other. A lower alignment film 232 is disposed on the electrodes 212, 222 and the lower substrate 202.

The electric field generated by the pixel and common electrodes 212, 222 is a smooth continuum of multiple domains. The IPS LCD provides equally fine visual performance at various different viewing angles, and has a smaller color shift compared to the IPS LCD of the first embodiment. Moreover, the configuration of the data lines 182 is similar to that of the electrodes 212, 222. Because there is no driving electric field at the margins between the data lines and the electrodes 212, 222, the pixel region has a smaller non-driven portion. That is, the IPS LCD has a higher display efficiency compared to the IPS LCDs of the first and second embodiments.

Figure 7:
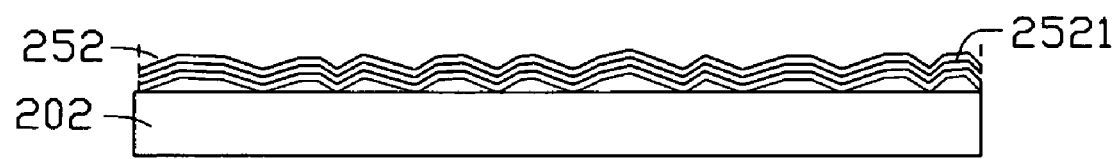
FIG. 7 is a schematic, inverted, side cross-sectional view of a reflection layer and a lower substrate of the reflective type IPS LCD of FIG. 5.
Figure 8:
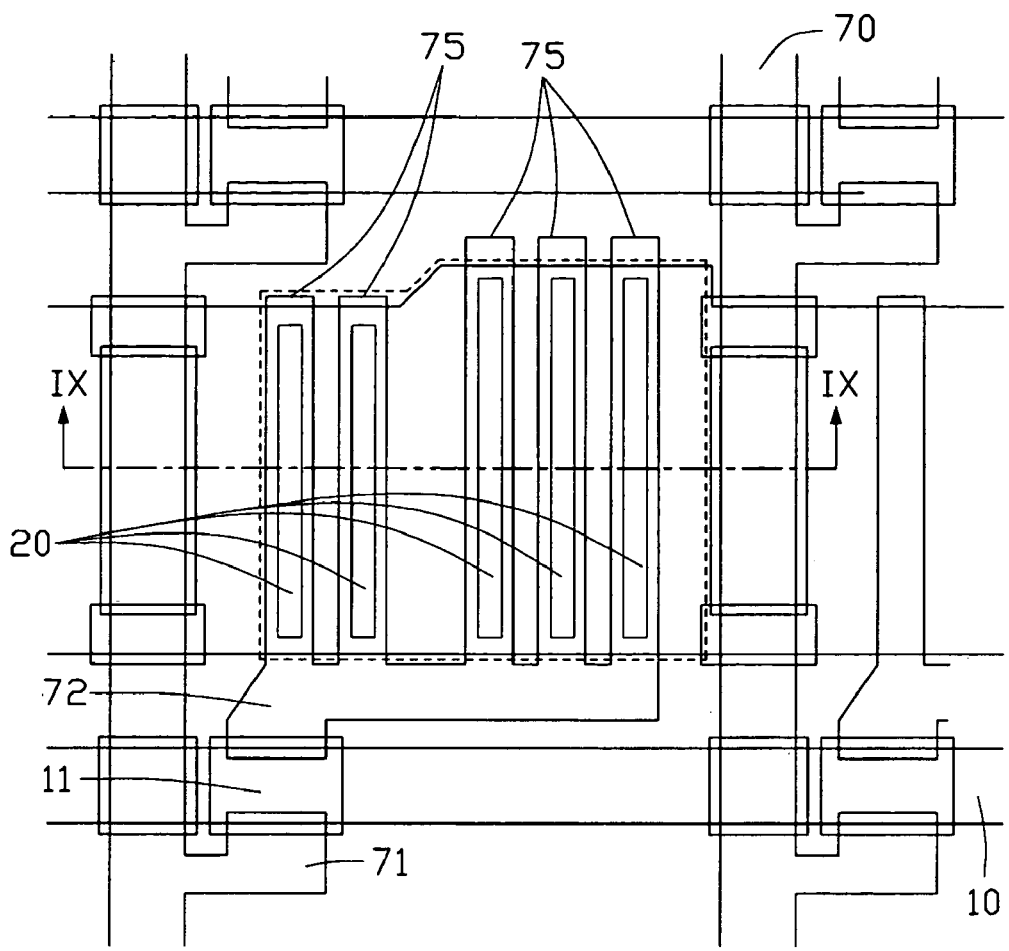
FIG. 8 is a schematic, top elevation of a pixel region of a conventional IPS LCD.
Figure 9:
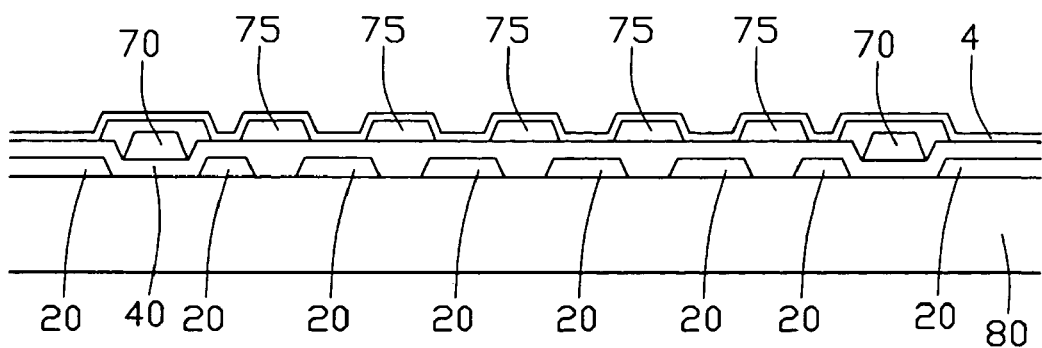
FIG. 9 is a schematic, cross-sectional view taken along line of IX-IX of FIG. 8.

Referring to FIG. 7, this is an inverted, cross-sectional view of the reflection layer 252 and the lower substrate 202, not showing the lower polarizer 262. The reflection layer 252 is multi-layer stack of dielectric materials. In particular, there are two dielectric materials: low refractive index polystyrene and high refractive index tellurium. The reflection layer 252 has a plurality of bumps 2521 for reflecting the light beams uniformly. In manufacturing the reflection layer 252, small particles are disposed on the lower substrate 202. Then the stack of dielectric materials is formed on the particles and the substrate 202. In this way, the bumps 2521 of the reflection layer 252 are obtained.

In an alternative embodiment, the pixel electrodes and common electrodes may have different configurations. For example, the pixel electrodes may have a zigzagged configuration and the common electrodes may have a wavy configuration. Peaks of the pixel electrodes are spaced from peaks of the common electrodes, and troughs of the pixel electrodes are spaced from troughs of the common electrodes.

It is also to be generally understood that even though numerous characteristics and advantages of the present invention have been set out in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A reflective type IPS (in-plane switching) liquid crystal display, comprising:
   a transparent upper substrate;
   a lower substrate;
   liquid crystal molecules interposed between the substrates;
   a reflection layer disposed at the lower substrate; and
   a plurality of gate lines and a plurality of data lines disposed at one of the substrates, thereby defining a plurality of pixel regions arranged in a matrix;
   wherein each pixel region comprises a plurality of pixel electrodes and a plurality of common electrode, the pixel electrodes and the common electrodes and the data lines each have an arcuate or wavy configuration, and the pixel electrodes and the common electrodes are uniformly spaced apart from each other.

2. The reflective type IPS liquid crystal display as claimed in claim 1, wherein the pixel electrodes and the common electrodes each have a zigzagged configuration.

3. The reflective type IPS liquid crystal display as claimed in claim 1, wherein the bent configuration of the pixel electrodes is different from the bent configuration of the common electrodes.

4. The reflective type IPS liquid crystal display as claimed in claim 1, wherein the reflection layer comprises a multi-layer stack comprising a low refractive index material and a high refractive index material.

5. The reflective type IPS liquid crystal display as claimed in claim 4, wherein the low refractive index material is polystyrene and the high refractive index material is tellurium.

* * * * *